United States Patent [19]
Yamasaki

[11] Patent Number: 4,500,192
[45] Date of Patent: Feb. 19, 1985

[54] AUTOMATIC EXPOSURE CONTROLLER FOR A CAMERA

[75] Inventor: Masafumi Yamasaki, Hachioji, Japan

[73] Assignee: Olympus Optical Co., Ltd., Tokyo, Japan

[21] Appl. No.: 527,504

[22] Filed: Aug. 29, 1983

Related U.S. Application Data

[63] Continuation of Ser. No. 356,125, Mar. 8, 1982, abandoned.

[30] Foreign Application Priority Data

May 27, 1981 [JP]  Japan ................................. 56-81587

[51] Int. Cl.³ ............................................. G03B 7/093
[52] U.S. Cl. ..................................... 354/427; 354/458
[58] Field of Search ................ 354/23 D, 24, 50, 51, 354/60 A, 60 R, 426, 427, 441–443, 445, 484, 458, 459; 364/111, 400, 525, 526; 340/347 C

[56] References Cited

U.S. PATENT DOCUMENTS 4,277,155  7/1981  Rentschler ..................... 354/23 D Primary Examiner—William B. Perkey
Attorney, Agent, or Firm—Louis Weinstein

[57] ABSTRACT

An automatic exposure controller for a camera comprises an analog-to-digital converter which converts a logarithmically compressed voltage corresponding to the brightness of an object being photographed into a digital value. A central processing unit receives the digital value as well as exposure information relating to a diaphragm aperture, film speed and the like, and responds thereto by calculating an exposure period, which is then stored. Upon shutter release, the digital value from the central processing unit is converted into a corresponding analog value by a digital-to-analog converter, and is then expanded into the real time.

8 Claims, 4 Drawing Figures

AUTOMATIC EXPOSURE CONTROLLER FOR A CAMERA

This is a continuation of application Ser. No. 356,125 filed Mar. 8, 1982 now abandoned.

BACKGROUND OF THE INVENTION

The invention relates to an automatic exposure controller for a camera, and more particularly, to such controller in which a digital processing technique is employed to perform an arithmetic operation to determine an exposure period.

The recent trend is to use a digital circuit to form an automatic exposure controller for a camera. This is because in the data processing relating to exposure information, the use of digital signals affords a greater flexibility, and avoids the occurrence of leakage currents or a change of stored data with time, which is experienced in dealing with analog signals. Thus digital processing is more suitable for use in the exposure controller of a camera. On the other hand, an analog circuit can be simplified in its circuit arrangement as compared with a corresponding digital circuit. Also, where a digital circuit is used, there is a problem related with an error which is caused by the quantization of analog quantities which is required in using a digital circuit. For this reason, an analog circuit may be suitably used where the circuit arrangement requires increased accuracy. In an automatic exposure controller for a camera, an analog voltage proportional to the logarithm of the brightness of an object being photographed is converted into a digital format, and an exposure period is determined through a given arithmetic operation. A variety of techniques are available for expanding the digital version of the exposure period into a real time, but involve a complex circuit arrangement, an unsatisfactory accuracy or a complex calculation.

SUMMARY OF THE INVENTION

In view of the foregoing, it is an object of the invention to provide an automatic exposure controller for a camera including a combination of an A/D converter and an arithmetic circuit which enables digital processing in respect of a complex arithmetic operation and storage of the result to derive an exposure period in digital form, which is then expanded into a real time after D/A conversion by using an analog circuit.

It is another object of the invention to provide an automatic exposure controller for a camera wherein an A/D converter used comprises a combination of a D/A converter and a comparator, which D/A converter is shared for conversion of a digital value from an arithmetic circuit, representing an exposure period, into an analog version.

In accordance with the invention, the storage and the arithmetic operation which are required to control an exposure period in processed in a digital circuit, thus avoiding the occurrence of leakage current which may cause a change in the data being stored, with time. In this manner, an accurate arithmetic operation is assured which is based on the exact input data. A compact circuit arrangement facilitates a complex calculation. On the other hand, the analog circuit expands a digital version of the exposure period into a corresponding real time. This greatly simplifies the expansion into real time, and an exposure control is achieved with the simple circuit arrangement which utilizes the advantages of both the digital and the analog control.

In accordance with another aspect of the invention, an analog voltage is converted into a digital version by an A/D converter which includes a D/A converter. This D/A converter is also utilized in converting a digital value representing an exposure period into an analog version, thus simplifying the circuit arrangement. In addition, an analog switch which is used to form the D/A converter may have an offset error, which can be cancelled, thus enabling an exposure period to be determined with a high accuracy.

DESCRIPTION OF PREFERRED EMBODIMENT

Figure 1:
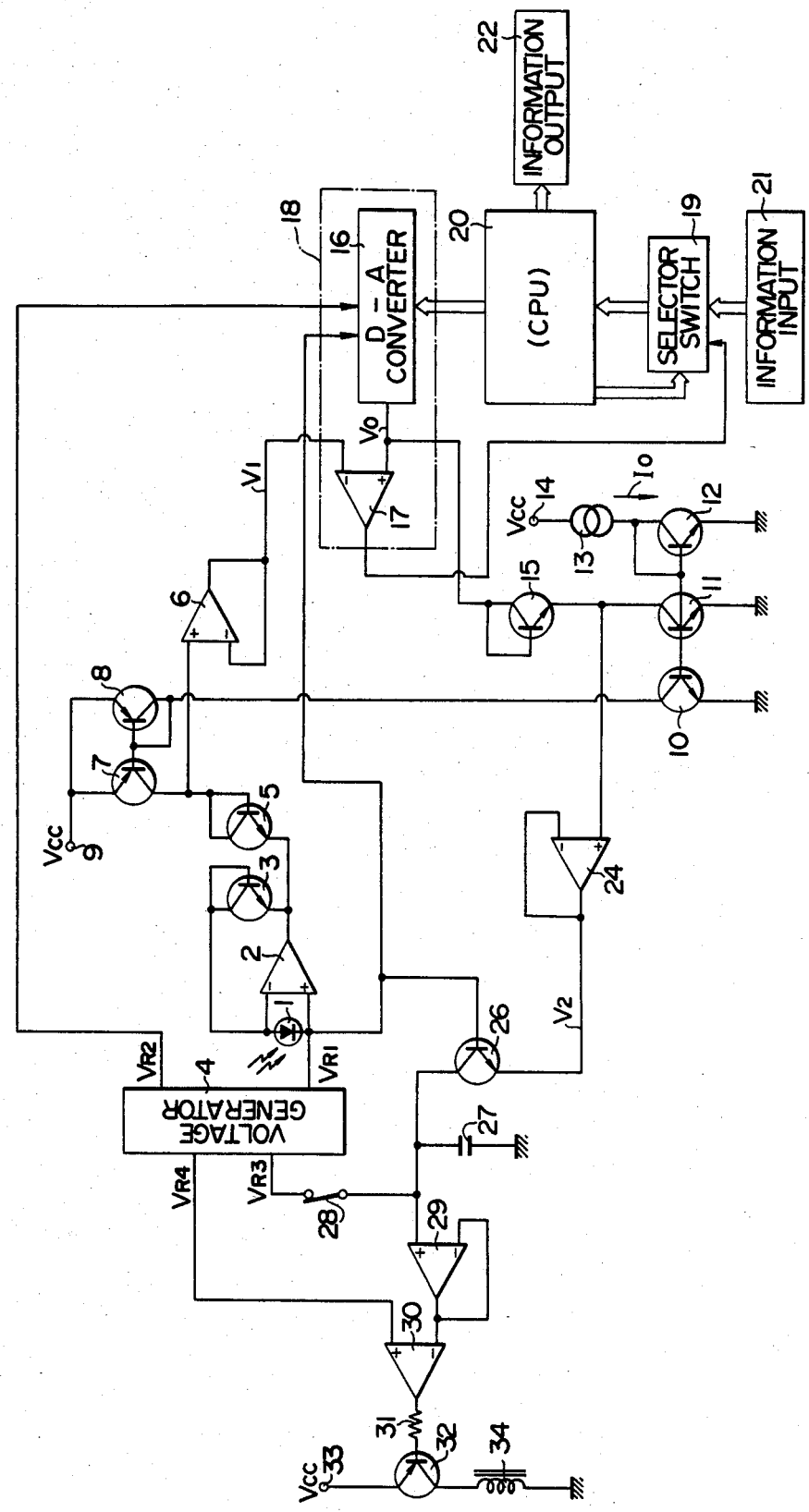
FIG. 1 is a circuit diagram of an automatic exposure controller according to one embodiment of the invention.

Referring to FIG. 1, there is shown a circuit diagram of an automatic exposure controller for a single lens reflex camera which is constructed in accordance with one embodiment of the invention. Specifically, light receiving element 1 such as a photodiode is provided for purpose of photometry, and has its anode connected to the inverting input terminal of an operational amplifier 2 while the cathode is connected to the non-inverting input terminal thereof. An NPN transistor 3 is connected across the inverting input terminal and the output terminal of the amplifier 2 to provide a logarithmic compression. The transistor 3 has its base and collector connected in common and connected to the inverting input terminal. As a result, a zero bias is maintained across the anode and the cathode of the photometric element 1, and a voltage proportional to the logarithm of an amount of light impinging upon the photometric element 1 is developed at the output of the amplifier 2. The non-inverting input terminal of the amplifier 2 is connected to a terminal of a reference voltage generator 4 at which a reference voltage VR1 is developed. The output terminal of the amplifier 2 is also connected to the emitter of an NPN transistor 5, which has its collector and base connected in common and connected to the non-inverting input terminal of an operational amplifier 6, forming a voltage follower, and also connected to the collector of a PNP transistor 7. The transistor 7 has its base connected to the base and collector of a PNP transistor 8, with the emitters of the transistors 7, 8 being connected in common to a terminal 9, to which a supply voltage Vcc is applied. In this manner, the transistors 7, 8 together form a current mirror circuit.

The transistor 8 has its collector connected to the collector of an NPN transistor 10, the base of which is connected to the bases of NPN transistors 11 and 12, with the emitters of the transistors 10, 11 and 12 connected to the ground. The transistors 10 to 12 also together form a current mirror circuit. The collector of the transistor 12 is connected to the base thereof and is connected through a constant current source 13 to a terminal 14, to which the supply voltage Vcc is applied. It is to be understood that the transistors 3, 5, 7, 8, 10, 11 and 12 have identical characteristics. Consequently, when a constant current $I_0$ flows through the collector of the transistor 12 through the constant current source 13, there occurs a current flow of constant magnitude $I_0$ through the collectors of the transistors 11, 10, 8 and 7. The collector of the transistor 11 is connected to the emitter of an NPN transistor 15, which has its base and collector connected in common and connected to an output terminal of a D/A converter 16. The output terminal of the converter 16 is also connected to the non-inverting input terminal of an operational amplifier 17, which forms a comparator. The inverting input terminal of the amplifier 17 is connected to the output terminal of the amplifier 6, forming the voltage follower, which is connected in common with the inverting input terminal thereof. The combination of the converter 16 and the amplifier 17 or comparator forms together an A/D converter 18, which is adapted to convert an analog voltage $V_1$, corresponding to the brightness of an object being photographed, into a corresponding digital value. The amplifier 17 compares the analog voltage $V_1$ against an output voltage $V_0$ from the converter 16, and produces an "H" level output ("1") for $V_0 > V_1$, and produces an "L" level output ("0") for $V_0 \leq V_1$.

The output terminal of the amplifier 17 is connected to a selector switch 19. In response to an instruction from a central processing unit 20 (CPU), the output from the amplifier 17 can be fed to CPU 20 through the selector switch 19, together with film speed and diaphragm aperture information supplied from an information input circuit 21. CPU 20 performs a variety of logical and arithmetic operations, renders a decision and a control over the storage. By way of example, an analog voltage corresponding to the brightness of an object being photographed is converted into a corresponding digital value before storage. CPU 20 calculates an APEX (additive system of photographic exposure) value Tv of an exposure period based on an APEX value Bv of the brightness of the object, an APEX value Sv of film speed and an APEX value Av of diaphragm aperture. It also calculates the value of a function f(Tv) of the APEX value Tv, thereby effecting a conversion into a desired exposure period. The output from CPU 20 is fed to the D/A converter 16 for conversion into a corresponding analog value. It is to be noted that reference voltages VR1, VR2 (VR1 < VR2) are supplied from the reference voltage generator 4 to the D/A converter 16. An information output circuit 22 is provided to effect a display of an exposure period which is supplied from CPU 20.

The emitter of the transistor 15 is connected to the non-inverting input terminal of an operational amplifier 24, which forms a voltage follower. The inverting input of the amplifier 24 is connected to the output terminal thereof, which is in turn connected to the emitter of an NPN transistor 26 which provides a logarithmic expansion. The transistor 26 has its base connected to the terminal of the reference voltage generator 4 where the reference voltage VR1 is developed. The collector of the transistor 26 is connected to one end of an integrating capacitor 27, the other end of which is connected to the ground. The collector is also connected through a trigger switch 28 to a terminal of the generator 4 where a reference voltage VR3 is developed, the trigger switch being opened at the same time as the initiation of an exposure process. The collector of the transistor 26 is also connected to the non-inverting input of an operational amplifier 29, forming a voltage follower, with the inverting input terminal of the amplifier 29 being connected to the output terminal thereof which is in turn connected to the inverting input terminal of an operational amplifier 30, which defines a comparator for determining the end of an exposure process. The non-inverting input terminal of the amplifier 30 is connected to a terminal of the generator 4 at which a reference voltage VR4 (< VR3) is developed. The output terminal of the amplifier 30 is connected through a resistor 31 to the base of a PNP transistor 32 having its emitter connected to a terminal 33, to which the supply voltage Vcc is applied, and having its collector connected to the ground through an electromagnet 34 which is effective to constrain a second blind of a focal plane shutter from running.

Figure 2:
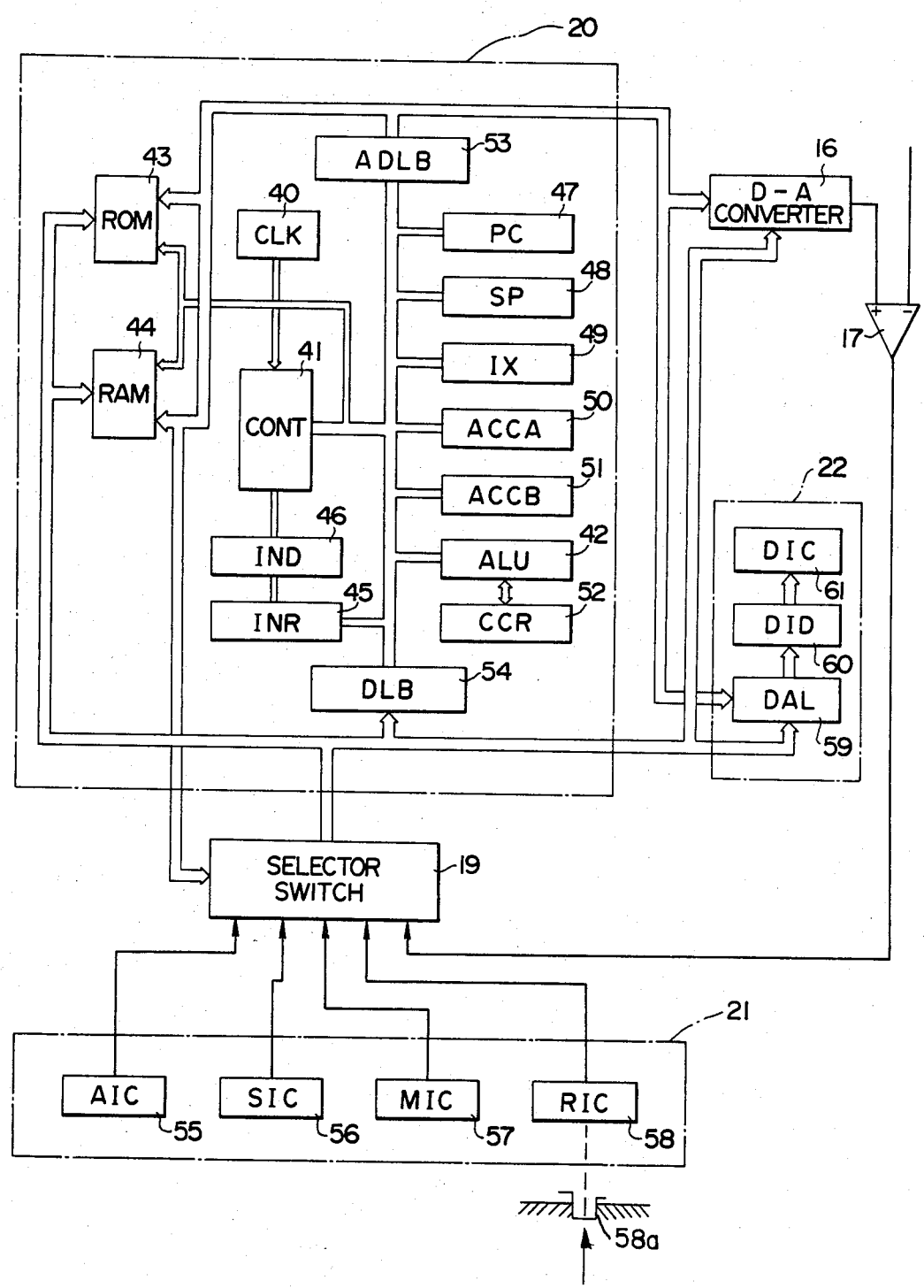
FIG. 2 is a block diagram of a central processing unit and its related peripheral circuit used in the controller of FIG. 1.

In the described exposure controller, CPU 20 and its associated input/output devices are arranged as shown in the block diagram in FIG. 2. CPU 20 includes a clock generator (CLK) 40 which produces a reference pulse used to control the operation of the entire circuit, and its output is fed to a control circuit (CONT) 41. The control circuit CONT 41 feeds a variety of control signals to an arithmetic operation and processing circuit (ALU) 42, read-only memory (ROM) 43, a random access memory (RAM) 44 and other circuits for operation thereof. For example, a control signal from CONT 41 which is applied to ROM 43 causes an instruction to be taken out of ROM 43, and a variety of static functional circuits of ALU 42 operate in a sequence which is signified by each instruction code to execute the instruction. An instruction register (INR) 45 temporarily stores an output from ROM 43 while an instruction decoder (IND) 46 supplies a control signal to CONT 41 in accordance with the content of an instruction supplied from INR 45. A program counter (PC) 47 stores the address of the instruction to be executed in order to assure the execution of a program in a proper sequence. It is to be noted that PC 47 stores addresses in an ascending order, increasing one by one. A stack pointer (SP) 48 provides a temporary store of the content of PC 47, an index register (IX) 49, an accumulator A (ACCA) 50, an accumulator B (ACCB) 51 and the like, in the event of occurrence of an interrupt during the execution of an instruction or of occurrence of a transfer to a subroutine so that the content may be non-destructively stored for re-use after returning from such instruction. The index register IX 49 stores the address of an instruction where an instruction is to be executed according to the index address scheme. As will be recognized, ALU 42 comprises an adder, a shift circuit and registers, and is functionally capable of performing an arithmetic and logical operation upon data and movement of data. The accumulators ACCA 50, ACCB 51 form the central registers used in the data processing. For example, when executing an instruction "X+Y=S", an instruction to enter "X" into ACCA 50 is initially executed, followed by the addition of "Y" to the content of ACCA 50. Subsequently, an instruction to load the sum into ACCA 50 produces a sum "S" in ACCA 50. A condition code register (CCR) 52 stores the result of an arithmetic operation. CCR 52 contains flags to control an interrupt function, and a conditional branch depending on the generation of a carry or borrow or zero in the result of an arithmetic operation or the occurrence of an overflow, and CPU 20 executes an instruction on the basis of the status of CCR 52. ROM 43 stores data representing instructions, which are sequentially read out by the operation of PC 47 to enable the execution of an instruction. RAM 44 temporarily stores data produced in the course of an arithmetic operation and other various input and output information. An address latch and buffer (ADLB) 53 temporarily stores an address signal fed from CPU 20, and converts it into an electrical signal of a magnitude which is required to drive ROM 43, RAM 44 and the selector switch 19. A data latch and buffer (DLB) 54 temporarily stores a data signal fed from CPU 20, and converts it into an electrical signal of a magnitude which is required to drive ROM 43, RAM 44 and the like.

The information input circuit 21 includes a diaphragm value input circuit (AIC) 55 which produces a digital code equivalent to the APEX value of the diaphragm aperture Av, so as to be fed through the selector switch 19 to CPU 20. In addition, the circuit 21 includes a film speed input circuit (SIC) 56 which produces a digital code equivalent to the APEX value of the film speed Sv to be fed through the selector switch 19, and a photometric signal input circuit (MIC) 57 which supplies data representing a photometric value so as to be fed through the selector switch 19 to CPU 20 in accordance with the intent of a photographer. CPU 20 responds to photometric information available at the time the photometric signal from MIC 57 is supplied, by calculating an exposure period Tv, which is utilized to derive a function f(Tv) previously stored in ROM 43, thus converting it to a desired exposure period. This can be utilized where an average value of a plurality of exposure periods is to be determined which result from the photometry of a plurality of spots on an image field. A release signal input circuit (RIC) 58 produces a release signal to be supplied to CPU 20 in response to a shutter release operation of a photographer by operation of shutter release button 58a. In response to the release signal, CPU 20 interrupts a photometric operation, and supplies exposure period information derived in accordance with the function f(Tv) to the D/A converter 16.

The selector switch 19 operates to select a particular one of the various circuits contained in the information input circuit 21 in accordance with a predetermined sequence of instructions.

The information output circuit 22 includes a display data latch (DAL) 59 which temporarily stores data to be displayed until a fresh display data is supplied from CPU 20, a display decoder (DID) 60 which converts the content of the data to be displayed into a signal format which is suitable to provide a 7-segment display or a dot display, and a display circuit (DIC) 61 which is formed by display elements such as liquid crystal elements or light emitting diodes to display the exposure period Tv or its converted value f(Tv) to the photographer.

The D/A converter 16 converts a digital value Tv or f(Tv) into a corresponding analog voltage when the exposure period is to be expanded into a real time, and also cooperates with the amplifier 17, operating as the comparator, to form the A/D converter 18 of sequential comparison type which converts an analog voltage corresponding to the brightness of an object being photographed and which is applied to the amplifier 17 into a corresponding digital value. The output of the amplifier 17 is supplied through the selector switch 19 to CPU 20. When the selector switch 19 is in a position to supply the output of the amplifier 17 to CPU 20, its level is determined by the CPU, and the CPU in turn controls changeover switches contained in the D/A converter 16 in association with individual bits to perform an analog-to-digital conversion of sequential comparison type, as will be further described later.

Figure 3:
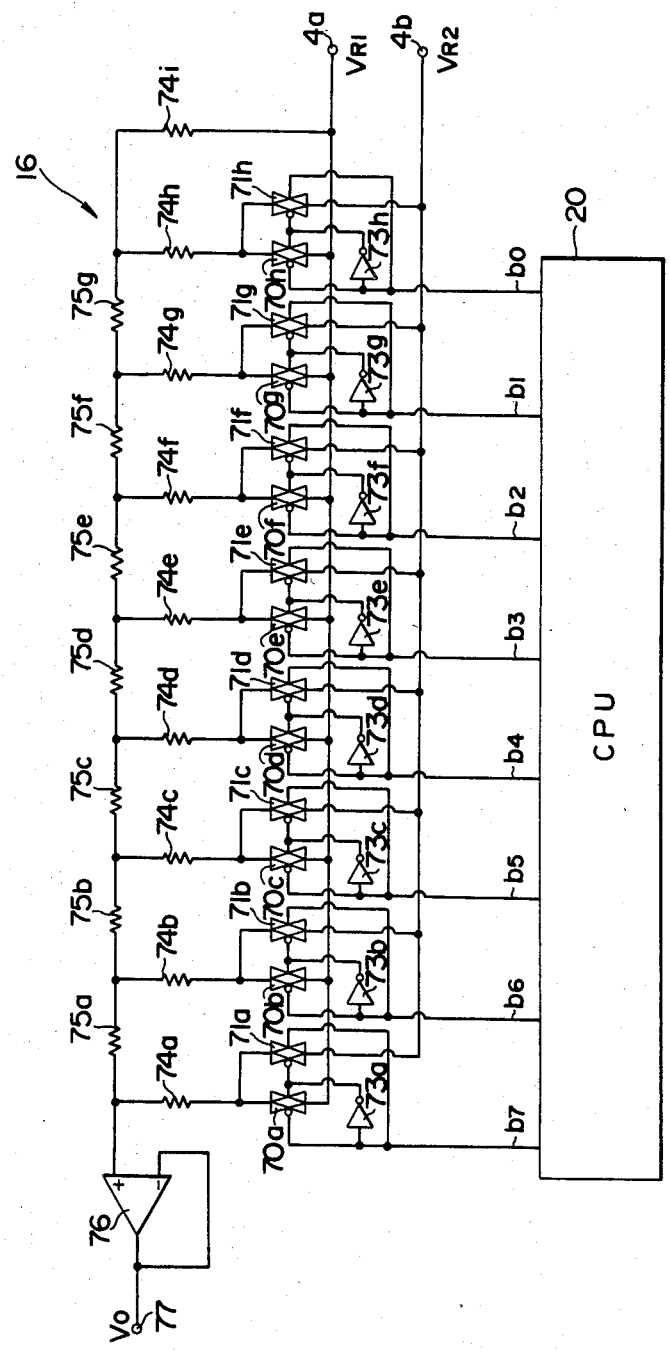
FIG. 3 is a circuit diagram of a D/A converter used in the controller of FIG. 1.

FIG. 3 shows the circuit arrangement of the D/A converter 16. The converter 16 is of an 8-bit ladder type, and includes eight pairs of changeover switches $70a$–$70h$ and $71a$–$71h$, which are formed by analog switches in the form of CMOS switches. One end of the switches $70a$–$70h$ is connected to a terminal $4a$ of the reference voltage generator 4 where the reference voltage VR1 is developed while one end of the switches $71a$–$71h$ is connected to a terminal $4b$ of the generator 4 where the reference voltage VR2 is developed. Each of the switches $70a$–$70h$ includes a control terminal, to which a respective bit signal $b_7$–$b_0$ is applied from CPU 20. Similarly, each of the switches $71a$–$71h$ includes a control terminal, to which the inversion of the respective bit signal $b_7$–$b_0$ is applied through an individual inverter $73a$–$73h$, respectively. The other end of the switches $70a$–$70h$ is connected together with the other end of the switches $71a$–$71h$, respectively, and is connected to one end of resistors $74a$–$74h$, respectively. The other end of the resistor $74a$ is connected to one end of a resistor bank comprising resistors $75a$–$75g$ connected in series. The other end of the resistor $74h$ is connected to the other end of the resistor bank while the other end of the resistors $74b$ to $74g$ is connected to an associated junction between adjacent resistors in the resistor bank. The junction between the resistors $74a$ and $75a$ is connected to the non-inverting input terminal of an operational amplifier 76, which forms a voltage follower. The junction between the resistors $74h$ and $75g$ is connected through a resistor $74i$ to the terminal $4a$. The amplifier 76 has its inverting input terminal connected with the output terminal thereof, which is connected to an output terminal 77 of the D/A converter 16. Representing the resistance of each of the resistors $75a$ to $75g$ by R, each of the resistors $74a$ to $74i$ has a resistance which is equal to 2R, and the reference voltages VR1 and VR2 are related such that VR2>VR1. When one of the bit signals $b_7$–$b_0$ supplied from CPU 20 assumes an "H" level, the corresponding one of the switches $70a$–$70h$ is closed to apply the reference voltage VR1 to one end of one of the resistors $74a$–$74h$. When one of the bit signals $b_7$–$b_0$ assumes an "L" level, the corresponding one of the switches $71a$–$71h$ is closed to apply the reference voltage VR2 to one end of one of the resistors $74a$–$74h$. Depending on the levels assumed by the respective bit signals $b_7$–$b_0$, the output voltage $V_0$ from the converter 16 can be expressed as follows:

$$V_0 = VR1 + \frac{VR2 - VR1}{2}(b_7 2^0 + b_6 2^{-1} + b_5 2^{-2} + b_4 2^{-3} + b_3 2^{-4} + b_2 2^{-5} + b_1 2^{-6} + b_0 2^{-7}) \qquad (1)$$

It is to be noted that the value of the bit signals $b_7$–$b_0$ is 1 for "H" level and is 0 for "L" level.

The operation of the automatic exposure controller will now be described. Representing a current produced by the element 1 (see FIG. 1) during the open photometry by $i_p$ and the collector current of the transistor 12 which flows through the constant current source 13 by $I_0$, the collector current of the transistor 7 is equal to $I_0$ by the current mirror effect mentioned previously. Accordingly, the collector potential $V_1$ of the transistor 7 is as follows:

$$V_1 = VR1 + \frac{kT}{q} \ln \frac{I_O}{i_p} \quad (2)$$

where k represents the Boltzmann's constant, T the absolute temperature and q the charge of an electron. The voltage $V_1$ is fed through the amplifier 6 to be applied to the inverting input terminal of the amplifier 17, which is combined with the D/A converter 16 to form the A/D converter 18 of sequential comparison type. The converter 18 then converts the photometric voltage $V_1$ into a corresponding digital value.

The analog-to-digital conversion will be considered in more detail. Before proceeding with the description, it is assumed that the reference voltages VR1 and VR2 satisfy the following relationship:

$$VR2 - VR1 = \frac{kT}{q} \ln\alpha \quad (3)$$

where $\alpha$ represents any constant. For the ease of explanation, it is assumed that an analog voltage as represented by the equality (2) corresponds to a digital code of "01100101". When the power is initially turned on, CPU 20 is reset and initialized. CPU 20 then accesses the converter 16 in a manner such that the most significant bit (MSB) or bit signal $b_7$ of the converter 16 assumes "1" while the remaining bit signals all assume "0". At this time, the output voltage $V_0$ from the converter 16 is an analog voltage corresponding to a digital value of "10000000" according to the equality (1). Hence, the output voltage $V_0$ from the converter 16 is greater than the photometric voltage $V_1$ since "10000000" > "01100101". Thus, the amplifier 17 produces a "1" output. This output is fed through the selector switch 19 to CPU 20, which responds by loading "0" into the least significant bit (LSB) of ACCB 51 in order to make MSB of the photometric data "0". CPU 20 then changes the bit signal $b_6$ to "1" and maintains the remaining bit signals except for the bit signal $b_6$ at "0". At this time, the output voltage $V_0$ from the converter 16 corresponds to "01000000", whereby it is related to the photometric voltage $V_1$ such that $V_0 < V_1$. Accordingly, the amplifier 17 produces "0" output, which causes CPU 20 to shift the content of ACCB 51 one bit position to the left while loading "1" into LSB thereof. Since $V_0 < V_1$, the bit signal $b_5$ is changed to "1" while maintaining the bit signal $b_6$ equal to "1" and rendering all other bit signals to "0". The converter 16 then provides the output voltage $V_0$ which corresponds to "01100000", which means that $V_0 < V_1$. Accordingly, the amplifier 17 again produces "0" output, which causes the content of ACCB 51 to shift one bit position to the left, followed by loading "1" into the LSB thereof. Since $V_0 < V_1$, the bit signal $b_4$ is changed to "1" while maintaining the bit signals $b_6$ and $b_5$ equal to "1" and all other signals equal to "0". The converter 16 now produces the output voltage $V_0$ which corresponds to "01110000", which means that $V_0 > V_1$. Thus, the amplifier 17 produces "1" output, which causes the content of ACCB 51 to shift one bit position to the left, followed by loading "0" into LSB thereof. Since $V_0 > V_1$, the bit signal $b_3$ is changed to "1" while maintaining the bit signals $b_6$ and $b_5$ equal to "1" and all other bit signals equal to "0". The converter 16 then produces the output voltage $V_0$ which corresponds to "01101000", which means that $V_0 > V_1$. Thus the amplifier 17 produces "1" output, which causes the content of ACCB 51 to shift one bit position to the left, followed by loading "0" into LSB thereof. Since $V_0 > V_1$ at this time, the bit signal $b_2$ is changed to "1" while maintaining the bit signals $b_6$ and $b_5$ equal to "1" and maintaining all other bit signals equal to "0". Thereupon, the output voltage $V_0$ assumes a value corresponding to "01100100", which means that $V_0 < V_1$. Thus the amplifier 17 produces "0" output, which causes the content of ACCB 51 to shift one bit position to the left, followed by loading "1" into LSB thereof. Since $V_0 < V_1$, the bit signal $b_1$ is changed to "1" while maintaining the bit signals $b_6$, $b_5$ and $b_2$ equal to "1" and maintaining all other bit signals equal to "0". This causes the output voltage $V_0$ to assume a value corresponding to "01100110", which means that $V_0 > V_1$. Thus the amplifier 17 produces "1" output, which causes the content of ACCB 51 to shift one bit position to the left, followed by loading "0" into LSB thereof. Since $V_0 > V_1$ at this time, the bit signal $b_1$ is returned to "0" while maintaining the bit signals $b_6$, $b_5$ and $b_2$ equal to "1", and the bit signal $b_0$ is also changed to "1". This causes the output voltage $V_0$ to assume a value corresponding to "01100101", which means that $V_0 = V_1$. It will thus be seen that the amplifier 17 produces "1" output for $V_0 > V_1$, and produces "0" output for $V_0 \leq V_1$. Consequently, for $V_0 = V_1$, the content of ACCB 51 is caused to shift one bit position to the left, followed by loading "1" into the LSB thereof, in the similar manner as occurred for $V_0 < V_1$.

The analog-to-digital conversion takes place in the manner mentioned above, with the result that a digital value of "01100101" is stored in ACCB 51. CPU 20 calculates an exposure period Tv, based on the digital value representing a photometric voltage which is stored in ACCB 51, and digital codes representing a diaphragm aperture Av and film speed Sv, and then accesses DAL 59 of the information output circuit 22 to feed the exposure time Tv thereto, allowing DIC 61 to display the exposure period. Assuming that a photographer forwards a photometric signal to MIC 57, CPU 20 determines the exposure period Tv by utilizing the function f(Tv) which is previously stored in ROM 43. This corresponds to the determination of an average exposure period in the photometry of a plurality of spots where the photometry takes place over a plurality of points distributed over an image field, for example. In this instance, the function f(Tv) represents an expression to provide an average value.

Subsequently, the depression of a shutter release switch causes CPU 20 to access the converter 16, and the average value f(Tv) is introduced into the individual bits $b_0$–$b_7$ of the converter. Thereupon, an analog voltage corresponding to the exposure period is developed as the output voltage $V_0$ from the converter 16.

It will be noted from the equations (1), (2) and (3) that the digital value does not contain any term which is related to the temperature, and thus a temperature coefficient remains zero. Thus, from the equations (1) and (3), the output voltage $V_0$ from the converter 16 is given as follows:

$$V_0 = VR1 + \frac{kT}{2q}(b_7 2^0 + b_6 2^{-1} + \ldots + b_0 2^{-7}) \ln\alpha \quad (4)$$

Assuming that the LSB of the converter 16 has a significance corresponding to one-eighth step, the equation (4) can be rewritten as follows:

$$V_0 = VR1 + \frac{kT}{q} \ln 2^{Tv/8} \qquad (5)$$

It is to be understood that Tv appearing in the equation (5) represents a digital code of the exposure period which is converted into a decimal number. It will be noted that the emitter potential $V_2$ of the transistor 26 is equal to the emitter potential of the transistor 15, or $$V_2 = V_0 - \frac{kT}{q} \ln \frac{I_O}{i_s} \qquad (6)$$

The substitution of the equation (5) into the equation (6) yields:

$$V_2 = VR1 + \frac{kT}{q} \ln \frac{i_s}{I_O} \cdot 2^{Tv/8} \qquad (7)$$

where $i_s$ represents the reverse saturation current of the transistors 3–15. Because the logarithmic expansion transistor 26 has a base potential which is maintained equal to VR1, the base-emitter voltage VBE of the transistor 26 is as follows:

$$VBE = VR1 - V_2 \qquad (8)$$

$$= -\frac{kT}{q} \ln \frac{i_s}{I_O} \cdot 2^{Tv2/8}$$

Thus, the collector current $I_1$ of the transistor 26 is defined as follows:

$$I_1 = i_s \times e^{(q/kT)VBE} = \frac{I_O}{2^{Tv/8}} \qquad (9)$$

Thus it will be seen that the collector current $I_1$ of the transistor 26 corresponds to the APEX value of the exposure period. When an upward movement of the movable mirror which occurs in response to the depression of the release switch is completed, the trigger switch 28 is opened, whereby the integrating capacitor 27 which has been charged to the reference voltage VR3 begins discharging in accordance with a current flow as defined by the equation (9). The voltage across the integrating capacitor 27 is fed through the amplifier 29 to the amplifier 30 which forms the comparator to determine the end of the exposure period, so that at a point in time when the output voltage from the amplifier 29 reduces below the reference voltage VR4 (<VR3), the output voltage from the amplifier 30 changes from its "L" to its "H" level, thereby rendering the transistor 32 non-conductive. In this manner, the electromagnet 34 is deenergized, allowing the second shutter blind to run, thus terminating an exposure process.

Figure 4:
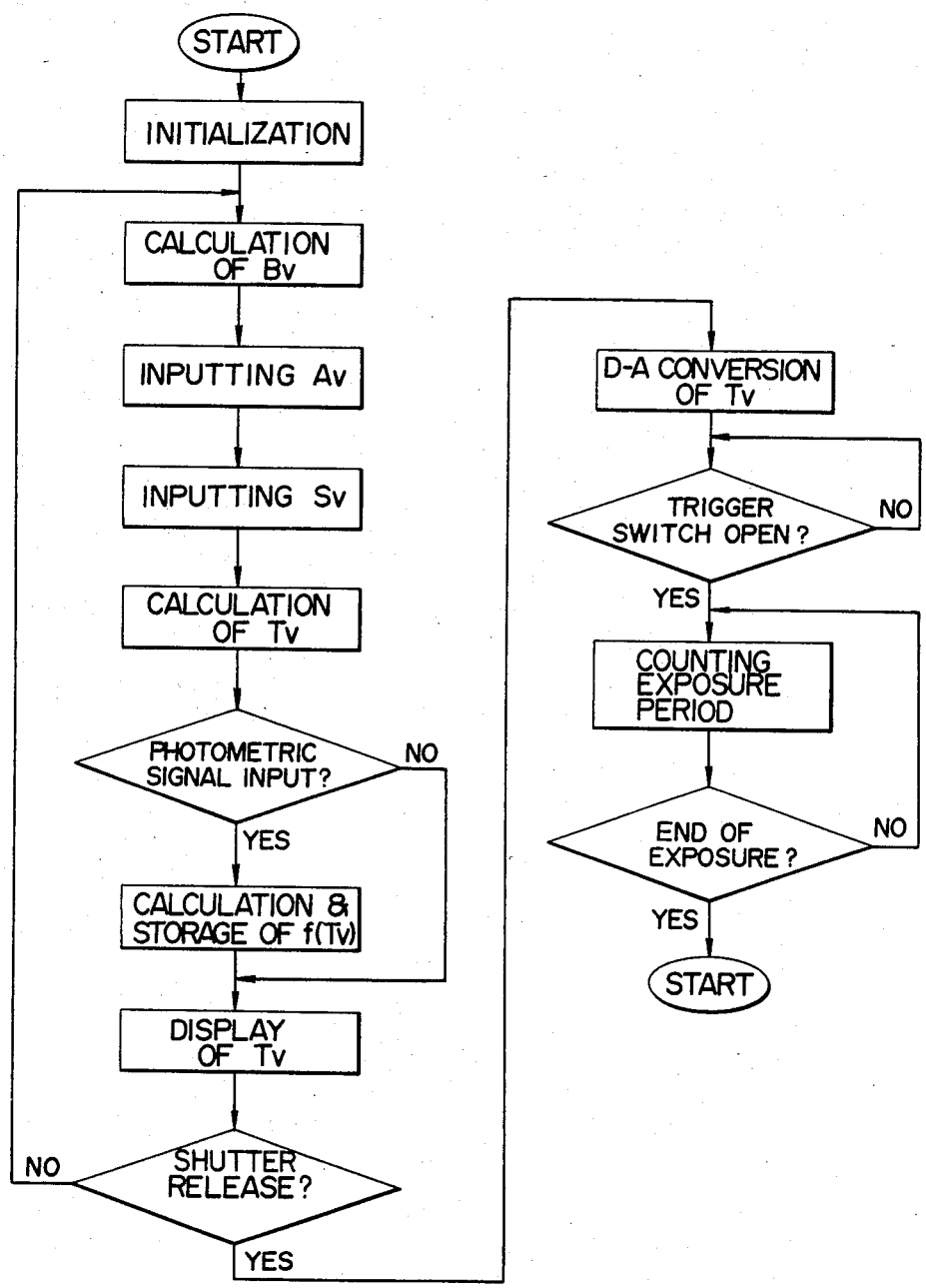
FIG. 4 is a flowchart illustrating a control operation by the controller of FIG. 1.

FIG. 4 is a flowchart illustrating a control operation performed by the automatic exposure controller mentioned above. Initially, whenever the power switch of the camera is turned on, the electrical circuit of the exposure controller shown in FIG. 1 is reset and initialized. Information relating to the brightness of an object being photographed which is detected by the photometric element 1 is logarithmically compressed and converted into a corresponding digital version by means of the converter 18 before it is fed to CPU 20 as the APEX value Bv. The APEX values Av and Sv representing the diaphragm aperture and film speed are introduced into CPU 20 from the information input circuit 21. Based on these values, CPU 20 calculates the APEX value Tv of the exposure period. When a photographer inputs a photometric signal, the function f(Tv) of the exposure period Tv is calculated and stored in CPU 20. The function f(Tv) may represent an average exposure period determined as a result of the photometry over a plurality of spots distributed across an image field, or any other conversion of the exposure period.

The APEX value Tv of the exposure period which is calculated in the manner mentioned above is displayed by the information output circuit 22, independently from the presence of a photometric signal input. Where the photometry over a plurality of spots takes place in response to a photometric signal input, the exposure period which is determined as an average is displayed. Subsequently, the shutter release causes the APEX value Tv of the exposure period to be converted into a corresponding analog version by means of the converter 16, and as the trigger switch 28 is opened, it is expanded into the real time for counting purpose. When the proper exposure period passes, the second shutter blind is allowed to begin running, thus terminating an exposure period. Subsequently, the automatic exposure controller returns to its start condition.

What is claimed is:

1. An automatic exposure controller for a camera comprising:
    photometry request means for generating a request signal requesting a photometry measurement;
    a light sensing element for generating an analog voltage signal representing brightness of the object to be photographed;
    compression means for logarithmaically compressing said analog signal;
    an analog-to-digital converter for converting the analog signal, in logarithmically compressed form from said compression means which signal corresponds to the brightness of an object being photographed, into a corresponding digital value;
    an information input circuit for providing exposure information relating to a diaphragm aperture, film speed or the like;
    an arithmetic circuit for determining a digital version of an exposure period responsive to said request signal on the basis of the digital value supplied from the converter and the exposure information from the information input circuit;
    a storage circuit for storing the digital version of the exposure period generated by said arithmetic circuit;
    means for generating a shutter release signal;
    a digital-to-analog converter for converting the digital version of the exposure period stored in the storage circuit prior to a shutter release operation as determined by the arithmetic circuit into a corresponding analog version in response to said shutter release signal;
    a transistor for providing a logarithmically expanded output current of the output voltage developed by the digital-to-analog converter;
    a capacitor for integrating the output current from the transistor upon the initiation of an exposure circuit;

an exposure decision circuit for determining the end of an exposure period in response to an integrated voltage across the capacitor reaching a given value; and means responsive to said decision circuit for generating a shutter closing signal.

2. An automatic exposure controller according to claim 1 in which the analog-to-digital converter comprises a digital-to-analog converter, and a comparator for comparing the output from the last mentioned digital-to-analog converter against an analog voltage corresponding to the brightness of an object being photographed, the digital-to-analog converter which forms the analog-to-digital converter being the digital-to-analog converter which is used to convert the digital value from the arithmetic circuit into a corresponding analog version.

3. An automatic exposure controller according to claim 1 in which the arithmetic circuit comprises a central processing unit.

4. An automatic exposure controller for a camera comprising:

photometry means for generating a logarithmically compressed signal corresponding to the brightness of an object to be photographed;

first converting means for converting the logarithmically compressed signal into digital form;

input means for receiving information relating to the exposure;

exposure determining means responsive to said input means and said first converting means for determining a proper exposure period which is represented in digital form;

storing means for storing the exposure period determined by said exposure determining means;

a shutter release button and means for generating a shutter release signal in response to operation of the shutter release button;

second converting means responsive to said shutter release signal for converting said digital exposure period stored in said storing means into analog form;

semiconductive means for logarithmically expanding the analog signal representing said exposure period;

integrating means for integrating the logarithmically expanded signal; and comparing means for generating an exposure terminating signal when the output of said integrating means reaches a predetermined value.

5. An automatic exposure controller for camera comprising:

photometry means for generating a signal corresponding to the brightness of an object to be photographed;

first converting means for converting the signal from said photometry means into digital form;

input means for receiving information relating to the exposure;

exposure determining means responsive to said input means and the digital signal from said first converting means for determining a proper exposure period which is represented in digital form;

storing means for storing the digital output of the exposure determining means;

a shutter release button and means for generating a shutter release signal responsive to operation of the shutter release button;

second converting means responsive to the shutter release signal for converting the digital exposure period stored in said storing means into analog form;

integrating means for integrating the analog signal developed by said second converting means; and means for comparing the integrated signal with a predetermined reference signal for providing an exposure terminating signal when the output signal developed by said integrating means reaches the level of said predetermined signal.

6. The controller of claim 5 wherein said first converting means comprises means for successively comparing a changing analog signal against the output signal of said photometry means for successively generating binary bits forming a multi-bit digital representation of said photometry means output signal, each binary bit being the result of each comparison.

7. A method for controlling the exposure period of a camera based upon a photometry signal and other information related to the exposure period comprising the steps of:

(a) developing a photometry signal representative of the brightness of the scene being photographed before initiating the photographing operation;

(b) logarithmically compressing the photometry signal;

(c) converting the compressed photometry signal into digital form;

(d) determining the exposure period based upon the digital form of said photometry signal and said related information and storing the exposure period in digital form;

(e) initiating a camera exposure period;

(f) converting the digital form of the exposure period into analog form upon initiation of the camera exposure period;

(g) logarithmically expanding the analog exposure period signal;

(h) integrating the expanded analog exposure period; and (i) terminating the exposure period when the integrated signal reaches a predetermined value.

8. The method of claim 7 further comprising repeating steps (a) through (d) for a plurality of spots in the image plane of the image being photographed prior to the photographing operation; and forming an average value exposure period from the stored plurality of exposure periods developed by the repetition of steps (a) through (d) and employing the average value generated for controlling the length of the exposure period.

* * * * *

UNITED STATES PATENT AND TRADEMARK OFFICE
CERTIFICATE OF CORRECTION

PATENT NO. : 4,500,192
DATED : February 19, 1985
INVENTOR(S) : Masafumi Yamasaki It is certified that error appears in the above-identified patent and that said Letters Patent is hereby corrected as shown below:

Column 1, line 59 delete "in" (1st occurrence) and insert --is--.

Column 2, line 63 and 64 delete "together" and insert

--cooperate to--.

Column 5, line 68 after CPU (2nd occurrence) insert --20--.

Column 9, equation 8 change "Tv2/8" to --Tv/8--.

Signed and Sealed this

Thirtieth Day of July 1985

[SEAL]

Attest:

DONALD J. QUIGG

Attesting Officer    Acting Commissioner of Patents and Trademarks